(12) United States Patent
Karaki

(10) Patent No.: US 7,395,450 B2
(45) Date of Patent: Jul. 1, 2008

(54) SYNCHRONOUS/ASYNCHRONOUS INTERFACE CIRCUIT AND ELECTRONIC DEVICE

(75) Inventor: Nobuo Karaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 454 days.

(21) Appl. No.: 10/969,000

(22) Filed: Oct. 21, 2004

(65) Prior Publication Data

US 2005/0135424 A1 Jun. 23, 2005

(30) Foreign Application Priority Data

Nov. 19, 2003 (JP) ............................. 2003-389190

(51) Int. Cl.
*G06F 1/12* (2006.01)
(52) U.S. Cl. ...................... 713/600; 713/400
(58) Field of Classification Search ................. 713/600, 713/400
See application file for complete search history.

(56) References Cited

U.S. PATENT DOCUMENTS

| | | | | |
|---|---|---|---|---|
| 5,063,536 A | | 11/1991 | Tinder et al. | |
| 5,469,547 A | * | 11/1995 | Pawlowski | 713/600 |
| 5,961,626 A | * | 10/1999 | Harrison et al. | 710/305 |
| 6,961,863 B2 | * | 11/2005 | Davies et al. | 713/500 |
| 6,978,391 B2 | * | 12/2005 | Ito et al. | 713/401 |

\* cited by examiner

*Primary Examiner*—Thuan N Du
(74) *Attorney, Agent, or Firm*—Oliff & Berridge, PLC

(57) ABSTRACT

An exemplary embodiment provides a synchronous/asynchronous interface circuit and an electronic device for coupling an asynchronous circuit block onto a globally synchronous circuit system. A synchronous/asynchronous interface circuit according to an exemplary embodiment of the present invention includes a finite state machine that controls access cycles between a synchronous bus and an asynchronous CPU in an event-driven fashion and a detection circuit that detects beginnings of the access cycles. In interfacing with the asynchronous CPU, the finite state machine controls the access cycles by transiting in states handshaking with the asynchronous CPU. Meanwhile, in interfacing with the synchronous bus, the finite state machine controls the access cycle by transiting in states synchronizing with a global clock supplied from the synchronous bus.

6 Claims, 9 Drawing Sheets

COMPOSITION AND CONNECTION
OF SYNCHRONOUS/ASYNCHRONOUS
INTERFACES

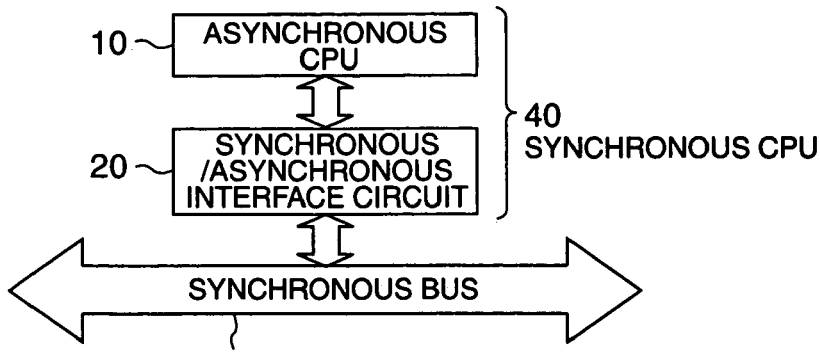

FIG. 1

| TYPE | NAME | SIGNAL NAME | INPUT/OUTPUT | FUNCTION |
|---|---|---|---|---|
| POWER SOURCE | POWER SOURCE | Vdd | INPUT | + POWER SOURCE INPUT |
| | GROUND | Vss | INPUT | - POWER SOURCE INPUT |
| CLOCK | CLOCK INPUT | CLK | INPUT | GLOBAL CLOCK |
| | CLOCK OUTPUT | PK | OUTPUT | BUS CYCLE SIGNAL |
| | | PL | OUTPUT | |
| ADDRESS BUS | ADDRESS BUS | A15-00 | OUTPUT | 16-BIT ADDRESS BUS |
| DATA BUS | DATA BUS | D7-0 | INPUT/OUTPUT | 8-BIT BI-DIRECTIONAL DATA BUS |
| BUS CONTROL SIGNAL | WAIT | WAIT_ | INPUT | WAIT STATE INSERTION |
| | READ | RD_ | OUTPUT | READ SIGNAL |
| | WRITE | WR_ | OUTPUT | WRITE SIGNAL |

INPUT/OUTPUT SIGNALS OF SYNCHRONOUS CIRCUIT

FIG. 2

| TYPE | NAME | SIGNAL NAME | INPUT/OUTPUT | FUNCTION |
|---|---|---|---|---|
| ELECTRIC SOURCE | ELECTRIC SOURCE | Vdd | INPUT | + POWER SOURCE INPUT |
| | GROUND | Vss | INPUT | - POWER SOURCE INPUT |
| ADDRESS BUS | ADDRESS BUS | a15-00 | OUTPUT | 16-BIT ADDRESS BUS |
| DATA BUS | DATA BUS | d7-0 | INPUT/OUTPUT | 8-BIT BI-DIRECTIONAL DATA BUS |
| BUS CONTROL SIGNAL | READ | rd_ | OUTPUT | READ SIGNAL |
| | WRITE | wr_ | OUTPUT | WRITE SIGNAL |
| | ACKNOWLEDGE | ack_ | INPUT | READ/WRITE SIGNAL ACKNOWLEDGEMENT |

INPUT/OUTPUT SIGNALS OF ASYNCHRONOUS CPU

FIG. 3

BUS CYCLE OF SYNCHRONOUS CPU

BUS CYCLE OF SYNCHRONOUS CPU

STATE OF SYNCHRONOUS CPU BUS CYCLE

READ CYCLE HANDSHAKING

READ CYCLE OF ASYNCHRONOUS CPU

WRITE CYCLE HANDSHAKING

WRITE CYCLE OF ASYNCHRONOUS CPU

COMPOSITION AND CONNECTION
OF SYNCHRONOUS/ASYNCHRONOUS
INTERFACES

CONNECTION OF DIFFERENTIAL CIRCUIT

DIFFERENTIAL CIRCUIT

CLK SIGNAL DIFFERENTIAL WAVE

THROUGH LATCH CONNECTION

THROUGH LATCH CIRCUIT

BUS CYCLE START-DETECTION CIRCUIT

TIMING FOR STARTING BUS CYCLE

CIRCUIT PK OUTPUT CIRCUIT (S1 to S2)

SIGNAL TRANSITION GRAPH OF
ASYNCHRONOUS/SYNCHRONOUS BUS CYCLE

SYNCHRONOUS/ASYNCHRONOUS INTERFACE CIRCUIT AND ELECTRONIC DEVICE

BACKGROUND OF THE INVENTION

1. Field of Invention

An exemplary embodiment of the present invention relates to techniques of coupling asynchronous circuits onto a synchronous circuit driven by a global clock. More particularly, an exemplary embodiment of the present invention relates to interface circuits to connect an asynchronous circuit to a synchronous circuit, and also relates to electronic devices including the asynchronous circuits, synchronous circuits and the interface circuits.

2. Description of Related Art

It is a minimum requirement for related art synchronous circuits to settle into the next state within a clock cycle. This means that, in the critical path, the sum of switching delays of sequential circuits and the setup time of a combination circuit must be sufficiently smaller than a clock cycle at the nominal voltage and temperature. The same requirement must be met when an asynchronous circuit block is embedded into a synchronous circuit system. If the requirement is not satisfied due to the delay in response of the asynchronous circuit block, the asynchronous circuit block needs to be redesigned or the frequency of the global clock needs to be lowered. The above is disclosed in U.S. Pat. No. 5,063,536.

SUMMARY OF THE INVENTION

However, trouble typically results in redesigning the asynchronous circuit block to meet the above-mentioned minimum requirement. Moreover, even if the requirement could be met by lowering the frequency of the global clock, another problem must arise, in that the throughput of the whole synchronous circuit system decreases.

In consideration of these and/or other issues, an exemplary embodiment of the present invention provides a synchronous/asynchronous interface circuit to embed an asynchronous circuit block in a synchronous circuit system without decreasing the throughput of the entire synchronous circuit system and without redesigning the asynchronous circuit block to meet the aforementioned minimum requirement, and an electronic device including the asynchronous circuit block, the synchronous circuit system and the synchronous/asynchronous interface circuit.

In order to address or solve the above, the synchronous/asynchronous interface circuit according to an exemplary embodiment of the present invention controls an interface between a synchronous circuit and a asynchronous circuit, and includes a finite state machine to control, in an event-driven fashion, an access cycle operated between the synchronous circuit and the asynchronous circuit, and a detection circuit to detect the beginning of the access cycle. In interfacing with the asynchronous circuit, the finite state machine controls the access cycle by transiting in states handshaking with the asynchronous circuit. Meanwhile, in interfacing with the synchronous circuit, the finite state machine controls the access cycle by transiting in states synchronizing with a global clock supplied from the synchronous circuit. Such a configuration enables embedding of the asynchronous circuit into the synchronous circuit as a part of an entire synchronous circuit system without decreasing the throughput of the whole synchronous circuit system, since the asynchronous circuit operates as a synchronous circuit at the interface with the synchronous circuit.

Preferably, the detection circuit to detect the beginning of the access cycle can include a differential circuit to differentiate a global clock supplied from a synchronous circuit and a through-latch circuit to latch a control signal that starts the access cycle when the logic state of either the rising-edge signal or the falling-edge signal of the global clock, which is output from the differential circuit, changes. Because it is asynchronous to the global clock for the asynchronous circuit to start the access cycle, the transition from a meta-stable state to a stable state can be swiftly carried out, even when the start of the access cycle is coincident with the logic state change of the global clock.

Preferably, the synchronous/asynchronous interface circuit of the present invention can further include an address latch circuit to latch the address signal output from the asynchronous circuit to the synchronous circuit and a data latch circuit to latch the data signal output from the asynchronous circuit to the synchronous circuit. The timing to output the address signal latched by the address latch circuit and to output a data signal latched by the data latch circuit into the synchronous circuit is controlled by the finite state machine in synchronization with the global clock. Such a configuration enables the timing of outputting the address signals and the date signals from the asynchronous circuit to the synchronous circuit to be synchronized with the global clock.

Preferably, the through-latch circuit included in the detection circuit that detects the beginning of the access cycle can be configured to be racing-free. By configuring the through-latch circuit in a racing-free condition, the state transitions of the finite state machine can be stabilized.

An electronic device according to an exemplary embodiment of the present invention is provided with the above-mentioned synchronous/asynchronous interface circuit. Such a configuration can provide a high-grade electronic device utilizing the characteristics of the synchronous/asynchronous interface circuit.

According to an exemplary embodiment of the present invention, a synchronous/asynchronous interface circuit operates as a part of a synchronous circuit interfacing an asynchronous circuit with the synchronous circuit. Therefore, the asynchronous circuit can be embedded into a globally synchronous circuit system as a part of the system without either decreasing the throughput of the system or re-designing the asynchronous circuit.

BRIEF DESCRIPTION OF THE DRAWINGS

FIG. 1 is a schematic that shows an entire composition of a synchronous/asynchronous interface circuit according to an exemplary embodiment of the present embodiment;

FIG. 2 is a schematic that shows input/output signals between a synchronous CPU and a synchronous bus;

FIG. 3 is a schematic that shows input/output signals between an asynchronous CPU and the synchronous/asynchronous interface circuit;

DETAILED DESCRIPTION OF PREFERRED EMBODIMENTS

In the following, exemplary embodiments of the present invention are described with reference to the accompanying drawings.

FIG. 1 illustrates an entire composition of a synchronous/asynchronous interface circuit according to an exemplary embodiment of the present invention. A synchronous/asynchronous interface circuit 20 lies between an asynchronous CPU 10 and a synchronous bus 30, linking the two. The synchronous/asynchronous interface circuit 20 is a circuit that makes the asynchronous CPU 10 apparently act as a synchronous CPU 40 for the synchronous bus 30. The synchronous/asynchronous interface circuit 20 operates in two ways. On one hand, it operates as a synchronous circuit unit driven by a global clock signal (CLK signal) at a point of connection with the synchronous bus 30. The synchronous/asynchronous interface circuit 20 satisfies the above-mentioned minimum requirement by the handshaking with the asynchronous CPU 10 regardless of the transition inner states. The inner states of the synchronous/asynchronous interface circuit 20 that are involved in the connection with the synchronous bus 30 transit in synchronization with a global clock. By configuring a through latch circuit to hold the inner states in a race-free condition, the synchronous/asynchronous interface circuit 20 shifts quickly from a metastable state to a stable state, even when the timing for handshaking with the asynchronous CPU 10, which is totally asynchronous with the global clock, competes with the timing of the global clock. On the other hand, at a point of connection with the asynchronous CPU 10, the synchronous/asynchronous interface circuit 20 operates as an asynchronous finite state machine, which is free from the global clock, and transits from one state to another by the handshaking with the asynchronous CPU 10.

The term "synchronous circuit" as used herein means a circuit designed to work based on a global clock for central control of the system. The synchronous bus 30 and the synchronous CPU 40 are synchronous circuits. The term "asynchronous circuit" as used herein means a circuit designed so that its minimal function circuits (processes) conduct distributed control independently or dependently from, and locally cooperating with, one another without using a global clock. In the asynchronous circuit, the minimal function circuits are controlled in an event-driven fashion and operate only when it is decided as necessary to operate independently or dependently. In other words, a minimal function circuit can operate in parallel with and independently from the other minimal function circuits, and it does not need to wait for the other minimal function circuits to complete their processing in order for itself to start processing. A minimal function circuit can start processing whenever it is prepared to execute a desired process. The asynchronous CPU 10 is an asynchronous circuit.

Figure 4:
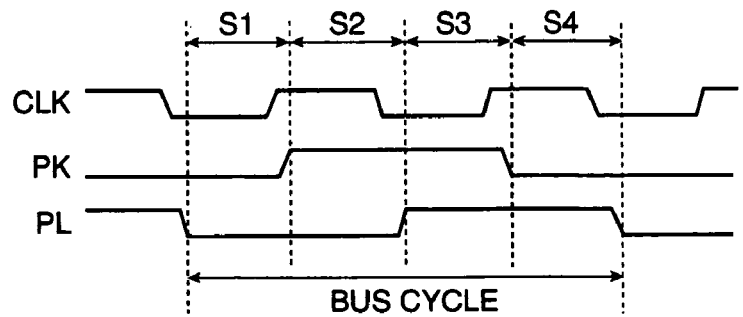
FIG. 4 is a schematic that shows a bus cycle of the synchronous CPU.
Figure 5:
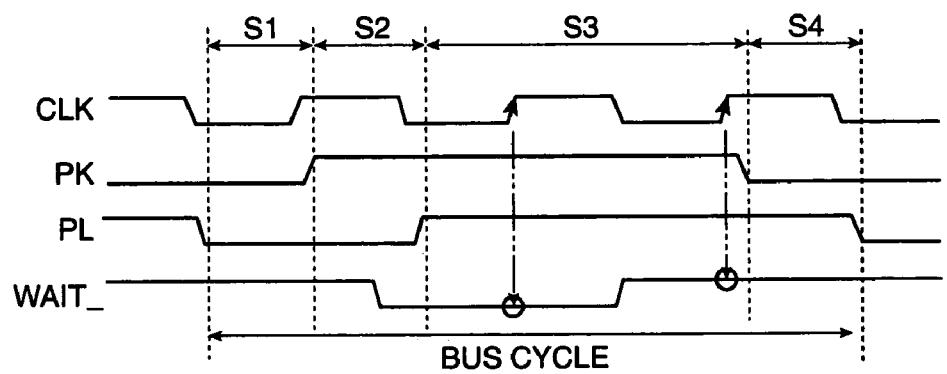
FIG. 5 is a schematic that shows a bus cycle of the synchronous CPU.

FIG. 2 shows input/output signals between the synchronous CPU 40 and the synchronous bus 30. FIG. 3 shows input/output signals between the asynchronous CPU 10 and the synchronous/asynchronous interface circuit 20. The term "X_signal" as used herein means that the X_signal is a low active signal. FIG. 4 illustrates a bus cycle of the synchronous CPU 40 acted by the synchronous/asynchronous interface circuit 20. As shown in FIG. 4, the bus cycle of the synchronous CPU 40 has four states: S1, S2, S3, and S4, in this order. Each of the states is encoded by a PK signal or a PL signal. More specifically, the state transits to S1 when PK=0 and PL=0, to S2 when PK=1 and PL=0, to S3 when PK=1 and PL=1, and to S4 when PK=0 and PL=1. While a WAIT_signal is omitted here for simplicity, when the synchronous CPU 40 accesses a low-speed device, it senses a WAIT_signal at the rising of a CLK signal in state S3. If WAIT_=0, the period of state S3 is extended by one clock as shown in FIG. 5. Although a bus cycle having four states is described here, this is not intended to limit the present invention. Furthermore, although in the present exemplary embodiment a bus cycle is described as an access cycle exchanged between an asynchronous CPU and a peripheral device, this is not intended to limit the present invention either.

Figure 6:
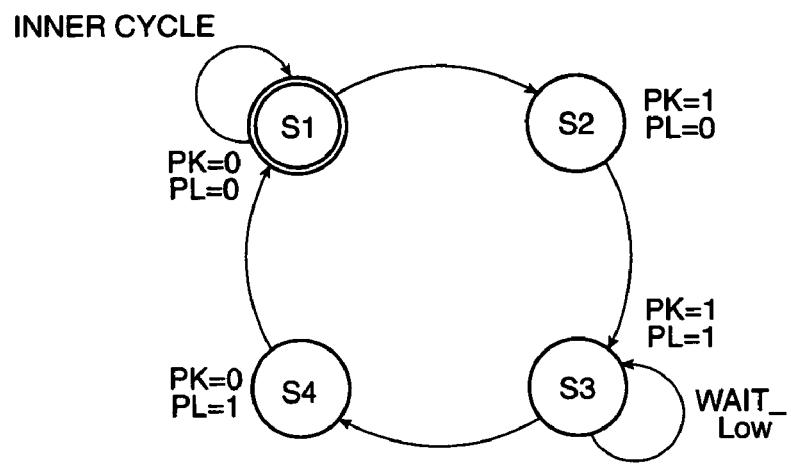
FIG. 6 is a schematic showing state transitions of a finite state machine.

FIG. 6 shows state transitions of the bus cycle of the synchronous CPU 40. When the synchronous CPU 40 executes the inner cycle inside the CPU without accessing the synchronous bus 30, the bus cycle is not executed and state S1 is maintained (PK=PL=0). If the synchronous CPU 40 accesses the synchronous bus 30, and thereby getting the bus cycle started, the state transits to state S2 (PK=1, PL=0) in half a clock and then to state S3 (PK=PL=1) in another half a clock. In state S3, the WAIT_signal is checked at the rising of the CLK signal. When WAIT_=0, the period of state S3 is extended for one more clock. When WAIT_=1 at the rising of the CLK signal, the state shifts from state S3 to state S4 (PK=0, PL=1), and then returns to state S1 (PK=PL=0) in another half a clock. As thus described, the synchronous CPU 40 accesses the synchronous bus 30 by running the bus cycle in synchronization with the rising or falling timing of the CLK signal.

Figure 7:
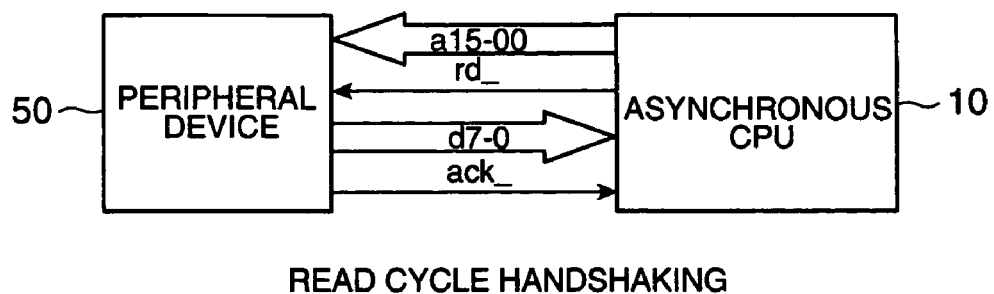
FIG. 7 is a schematic showing the handshaking of a read cycle.
Figure 8:
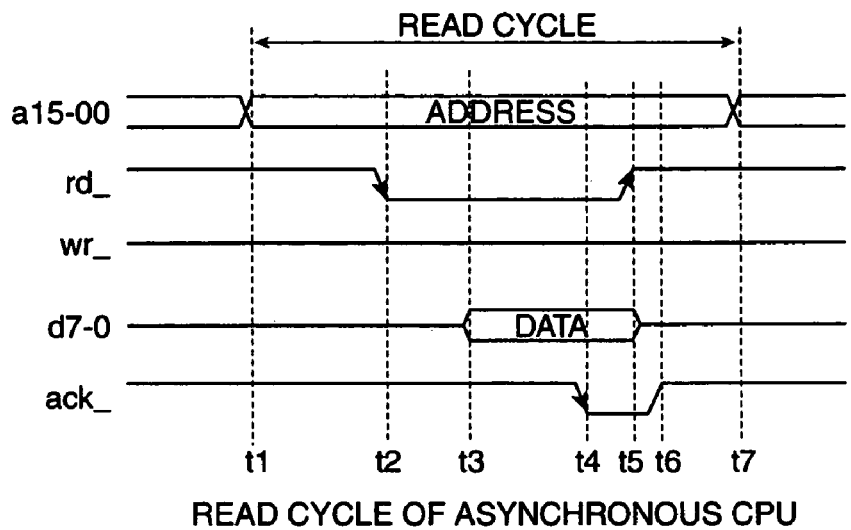
FIG. 8 is a schematic that illustrates a read cycle of the asynchronous CPU.

FIGS. 7 and 8 show the handshaking between the asynchronous CPU 10 and a peripheral device 50 when the asynchronous CPU 10 executes a read cycle without the synchronous/asynchronous interface circuit 20 therebetween. After outputting an address signal on an address bus a15-00 at a timing t1, the read cycle of the asynchronous CPU 10 begins by setting a rd_signal to active low at a timing of t2. Meanwhile, the read cycle of the peripheral device 50 begins when the rd_signal turns to active low. The peripheral device 50 outputs addressed number data onto the data bus d7-0 at a timing t3, and further turns an ack_signal to active low at a timing t4. As the ack signal becomes active low, the asynchronous CPU 10 detects the outputting of the desired data onto the data bus d7-0 and loads the data into the inner register. The asynchronous CPU 10 sets the rd_signal to negative high at a timing t5 when the writing of the data into the inner register is terminated, thereby announcing the completion of the read cycle. In response the peripheral device 50 sets the ack_signal to negative high at a timing t6 and confirms the completion of the read cycle. After the ack_signal turns to negative high, the asynchronous CPU 10 stops outputting the address data to the address bus a15-00 at a timing t7, which completes the read cycle. This way the read cycle of the asynchronous CPU 10 and the peripheral device 50 is accomplished by the four-phase handshaking using the rd_ and ack_signals.

Figure 9:
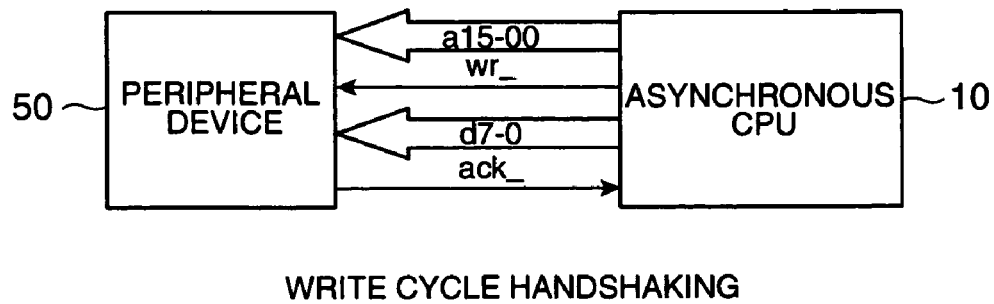
FIG. 9 is a schematic showing the handshaking of a write cycle.
Figure 10:
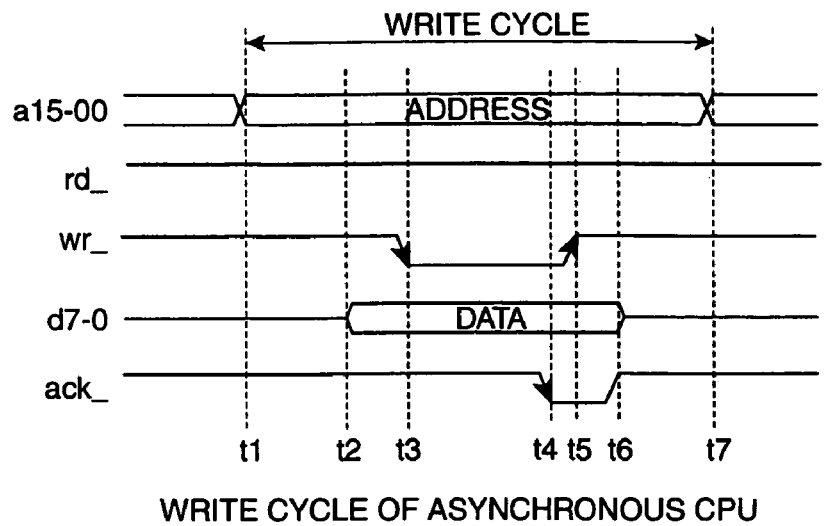
FIG. 10 is a schematic that illustrates a write cycle of the asynchronous CPU.

FIGS. 9 and 10 show the handshaking between the asynchronous CPU 10 and the peripheral device 50 when the asynchronous CPU 10 executes the write cycle without the synchronous/asynchronous interface circuit 20 therebetween. After outputting an address signal onto an address bus a15-00 at a timing t1, and then outputting data onto the data bus d7-0 at a timing t2 with a slight delay from t1, the write cycle of the asynchronous CPU 10 begins by setting a wr_signal to active low at a timing t3. Meanwhile, the peripheral device 50, upon receiving a write request from the asynchronous CPU 10, writes designated data (d7-0) into a designated address (a15-00) and sets the ack signal to active low at a timing t4. In response to the transition of the ask_signal to active low, the asynchronous CPU 10 sets the wr_signal to negative high at a timing t5 so as to announce completion of the write cycle and then terminates outputting data onto the data bus d7-0. Receiving the announcement of completion, the peripheral device 50 sets the ack_signal to negative high at a timing t6 and confirms the completion. With the ask_signal turning to negative high, the asynchronous CPU 10 detects the completion of the write cycle and terminates the outputting of the address data to the address bus a15-00 at a timing t7, and thereby completing the write cycle. As thus described, the write cycle between the asynchronous CPU 10 and the peripheral device 50 is accomplished by the four-phase handshaking using the rd_ and ack_signals.

Figure 11:
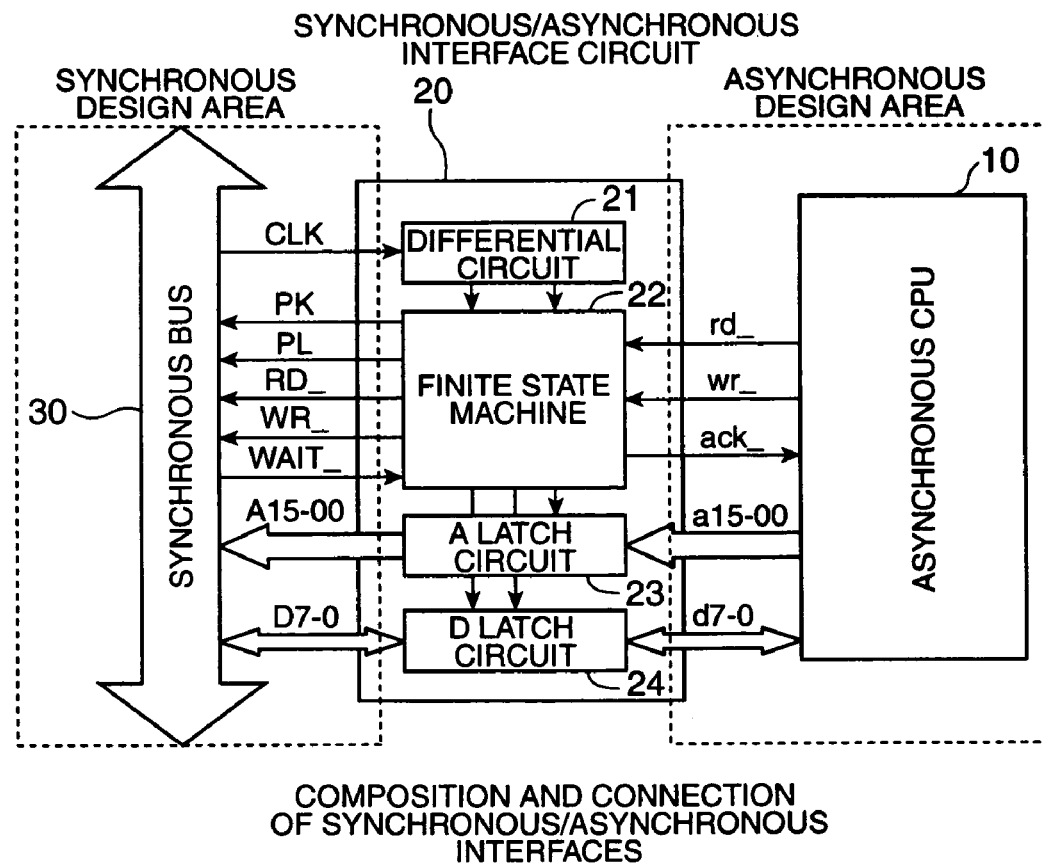
FIG. 11 is a schematic that shows composition of the synchronous/asynchronous interface circuit.

FIG. 11 is a composition of the synchronous/asynchronous interface circuit 20. As shown in the diagram, the synchronous/asynchronous interface circuit 20 mainly includes a differential circuit 21 to differentiate the CLK signal so as to produce rising edge and falling edge signals of the CLK signal, a finite state machine 22 to control a bus cycle operated between the asynchronous CPU 10 and the synchronous bus 30 in an event-driven fashion, an address latch circuit (A-latch circuit) 23 to latch address data output from the asynchronous CPU 10 to the synchronous bus 30, and a data latch circuit (D-latch circuit) 24 to latch data input and output between the asynchronous CPU 10 and the synchronous bus 30. The finite state machine 22 is an event-driven system to control the timing, in accordance with the bus cycle, to input and output bus control signals, address signals, and data signals exchanged between the asynchronous CPU 10 and the synchronous bus 30. In the interface with the asynchronous CPU 10, the finite state machine 22 controls the bus cycle by transiting states to asynchronous by the handshaking with the asynchronous CPU 10, while in the interface with the synchronous bus 30, the finite state machine 22 controls the bus cycle by transiting states in synchronization with a global clock supplied from the synchronous bus 30.

Since it is necessary that the synchronous/asynchronous interface circuit 20 acts as a peripheral device for the asynchronous CPU 10, the synchronous/asynchronous interface circuit 20 receives, on behalf of the peripheral device, the rd_signal or the wr_signal coming from the asynchronous CPU 10 and outputs the corresponding ask_signal onto the asynchronous CPU 10. Meanwhile, because the synchronous/asynchronous interface circuit 20 needs to operate as the synchronous CPU 40 for the synchronous bus 30, the synchronous/asynchronous interface circuit 20 outputs, on behalf of the asynchronous CPU 10, the RD_signal, WR_signal, PK signal, and PL signal to the synchronous bus 30, and receives, on behalf of the asynchronous CPU 10, the WAIT_signal output from the synchronous bus 30. The timing to output the bus control signals (RD_signal, WR_signal) and the clock signals (PK signal, PL signal) that come from the finite state machine 22 is synchronized with the rising signal or falling signal of the global clock coming from the differential circuit 21. Similarly, the timing to output the address signals from the A-latch circuit 23 to the synchronous bus 30 and the timing to output the data signals from the D-latch circuit 24 to the synchronous bus 30 are controlled by the finite state machine 22 so that the timings are synchronized with the rising signal or the falling signal of the global clock.

Mounted inside the finite state machine 22 is a bus cycle start-detection circuit (not shown) to detect the start of the bus cycle. The circuit detects the start of the bus cycle when the rd_signal or the wr_signal output from the asynchronous CPU 10 transits to active low. Then the state transits every half a clock as shown in the above-described drawing of state transitions (FIG. 6), and by following a communication procedure preallotted to each state, the bus cycle is controlled. The bus cycle start-detection circuit is described in detail below in reference to FIG. 19.

Figure 12:
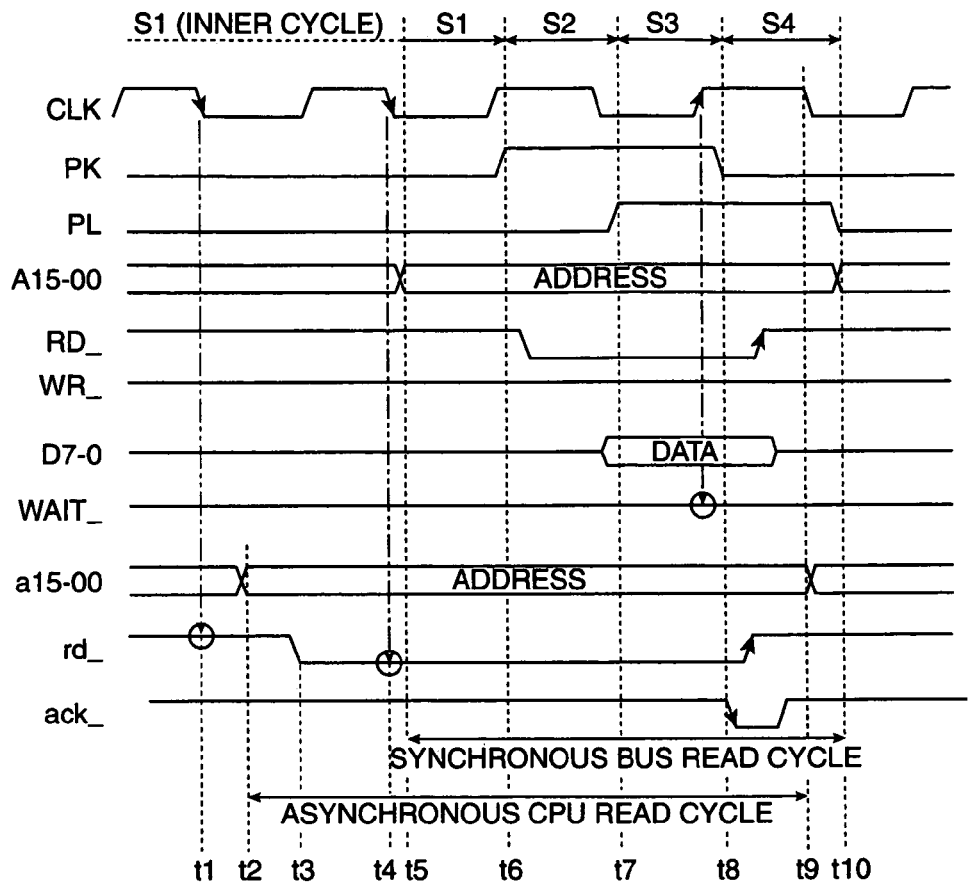
FIG. 12 is a schematic that illustrates a read cycle of the asynchronous CPU.

FIG. 12 shows handshaking to execute a read cycle between the asynchronous CPU 10 and the peripheral device 50 through the synchronous/asynchronous interface circuit 20. After an address is output onto the address bus a15-00 at a timing t2, the read cycle of the asynchronous CPU 10 begins by setting the rd_signal to active low at a timing t3. The bus cycle does not start at a timing t1, which precedes the timing t2, since the rd_signal is still negative high at the timing t1. When the rd_signal is sensed at a timing t4, which is one clock past the timing t1, the finite state machine 22 detects the beginning of the bus cycle because the rd_signal is now turned active low. At a timing t5, which is almost the same time as the timing t4, the states shift at every half a clock from S1, to S2, S3, and S4 in this order, and thereby the bus cycle is executed. This means that the read cycle is executed by the synchronous CPU 40. The A-latch circuit 23 latches the address data output onto the address bus a15-00 and outputs the latched address data onto the address bus A15-00 at the timing t5 at which the bus cycle begins. This makes the synchronous CPU 40 start the read cycle. Then, half a clock later at a timing t6 when the CLK signal rises, the finite state machine 22 shifts from state S1 to state S2 and sets the RD_signal to active low. In response to the transition of the RD_signal to active low, a peripheral device (not shown) coupled to the synchronous bus 30 outputs the addressed number data onto the data bus D7-0 half a clock later at a timing t7 when the CLK signal falls. In case of the read cycle, the D-latch circuit 24 passes data signals onto the data bus D7-0 without latching the data signals. At this point, the finite state machine 22 is in state S3.

The finite state machine 22 senses the WAIT_signal half a clock later at t8 when the CLK signal rises, confirms the signal to be negative high, and shifts from state S3 to state S4. As the synchronous/asynchronous interface circuit 20 needs to apparently act as a peripheral device for the asynchronous CPU 10, the synchronous/asynchronous interface circuit 20 sets the ack_signal to active low at a timing t8 in order to notify the asynchronous CPU 10 of the outputting of the desired data onto the data bus d7-0. Upon-detecting the ack- _signal being active low, the asynchronous CPU 10 writes into the inner register the data being output onto the data bus d7-0 and sets the rd_signal to negative high, thereby announcing the completion of the read cycle. Upon receiving this, the finite state machine 22 sets the RD_signal to negative high and announces completion of the read cycle to the peripheral device. As the rd_signal is set to negative high, the finite state machine 22 sets the ack_signal to negative high and confirms completion of the read cycle. After the ack_signal turns to negative high, the asynchronous CPU 10 terminates the outputting of address data onto the address bus a15-00 at a timing t9 and completes the read cycle of the asynchronous CPU 10. When the CLK signal falls at a timing t10, half a clock after the timing t8, the outputting of the address data onto the address bus A15-00 by the synchronous/asynchronous interface circuit 20 is terminated, and thus the read cycle by the synchronous CPU 40 is completed.

Figure 13:
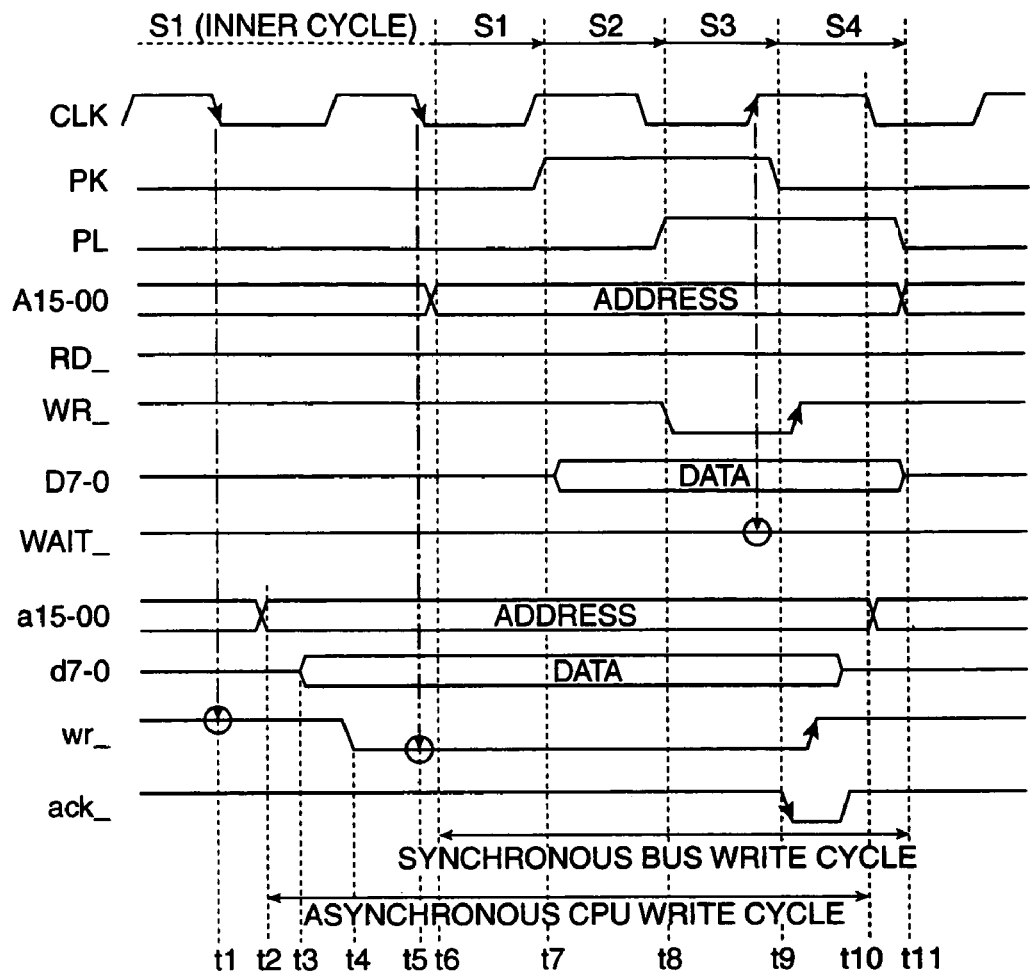
FIG. 13 is a schematic that illustrates a write cycle of the asynchronous CPU.

FIG. 13 illustrates the handshaking to execute a write cycle between the asynchronous CPU 10 and the peripheral device 50 through the synchronous/asynchronous interface circuit 20. After the address is output at a timing t2 onto the address bus a15-00, and then the data are output onto the data bus d7-0 at a timing t3, which is slightly after the timing t2, the write cycle of the asynchronous CPU 10 starts by setting the wr_signal to active low at a timing t4. The bus cycle does not begin at a timing t1, which precedes the timing t2, since the wr_signal is negative high. Upon sensing the wr_signal at a timing t5, which is one clock past the timing t1, the finite state machine 22 detects the start of the bus cycle since the wr_signal is now turned active low. At a timing t6, which is almost the same time as the timing t5, the finite state machine 22 makes the states shift from S1, to S2, S3, and S4 in this order every half a clock, and executes the bus cycle. This means that the write cycle is executed by the synchronous CPU 40. The A-latch circuit 23 latches the address data output onto the address bus a15-00 and outputs the latched address data onto the address bus A15-00 at a timing t6 at which the bus cycle begins. This triggers the write cycle by the synchronous CPU 40. The finite state machine 22 then transits from state S1 to state S2 half a clock later at a timing t7 when the CLK signal rises. The D-latch circuit 24 latches the data output onto the data bus d7-0 and outputs the latched address data onto the data bus D7-0 at a timing t7 when the finite state machine 22 transits from state S1 to state S2. Then, half a clock later, at a timing t8 when the CLK signal falls, the finite state machine 22 shifts from state S2 to state S3 and sets the WR_signal to active low.

The finite state machine 22 senses the WAIT_signal half a clock later at a timing t9 when the CLK signal rises, confirms the signal to be negative high, and shifts from state S3 to state S4. Since the synchronous/asynchronous interface circuit 20 needs to apparently act as the peripheral device for the asynchronous CPU 10, the synchronous/asynchronous interface circuit 20 sets the ack_signal to active low at the timing t9 when the writing of the data is completed by a peripheral device (not shown) coupled to the synchronous bus 30, and then notifies the asynchronous CPU 10 that the data writing is completed. The asynchronous CPU 10 then sets the wr_signal to negative high and announces completion of the write cycle. In response, the finite state machine 22 sets the WR_signal to negative high and announces completion of the read cycle to the peripheral device. When the wr_signal is set to negative high, the finite state machine 22 confirms completion of the write cycle by setting the ack_signal to negative high. After the ack_signal is set to negative high, the asynchronous CPU 10 then terminates the outputting of address data onto the address bus a15-00 at a timing t10, and thereby completing the write cycle by the asynchronous CPU 10. Half a clock after the timing t9, at a timing t11 when the CLK signal falls, the outputting of the address data onto the address bus A15-00 by the synchronous/asynchronous interface circuit 20 is terminated, and thus the write cycle by the synchronous CPU 40 is completed.

As described, when the synchronous/asynchronous interface circuit 20 detects the rd_signal or wr_signal being active low with the CLK signal at its falling edge, the synchronous/asynchronous interface circuit 20 shifts from the inner cycle to the bus cycle and makes time adjustment so that all of the bus control signals, data signals, and address signals output from the synchronous/asynchronous interface circuit 20 to the synchronous bus 30 are synchronized with the synchronous bus 30, enabling the connection of the asynchronous CPU 10 to the synchronous bus 30. The communication procedures for each state (S1, S2, S3, and S4) in the read cycle or the write cycle are predetermined. The synchronous/asynchronous interface circuit 20 can make the asynchronous CPU 10 apparently act as the synchronous CPU 40 for the synchronous bus 30, by executing the above-described communication procedures in accordance with the timings synchronized with the rising or falling signal of the CLK signal.

Figure 14:
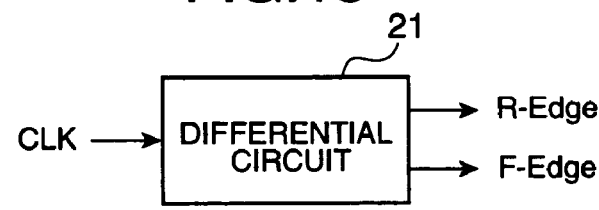
FIG. 14 is a schematic that shows connection of the differential circuit.
Figure 15:
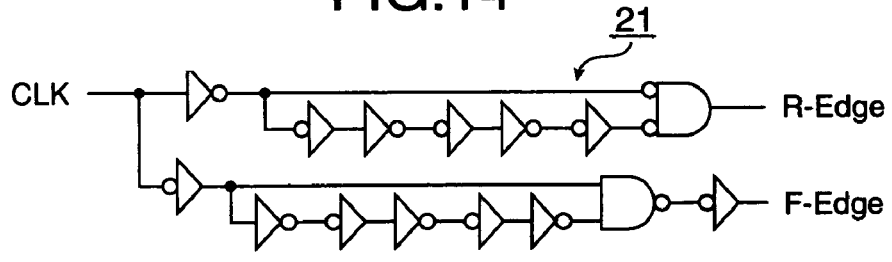
FIG. 15 is a schematic that illustrates composition of the differential circuit.
Figure 16:
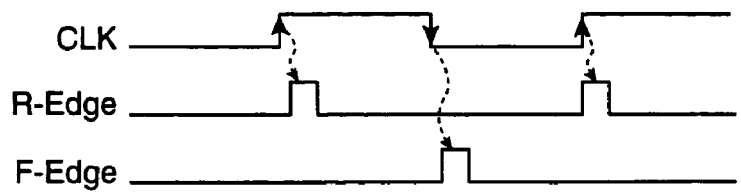
FIG. 16 is a schematic that shows differential waves output from the differential circuit.
Figure 17:
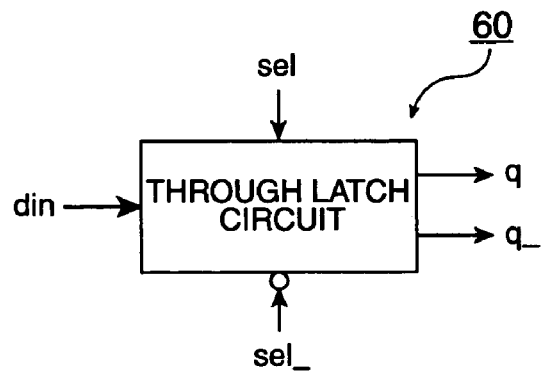
FIG. 17 is a schematic showing connection of a through latch circuit.
Figure 18:
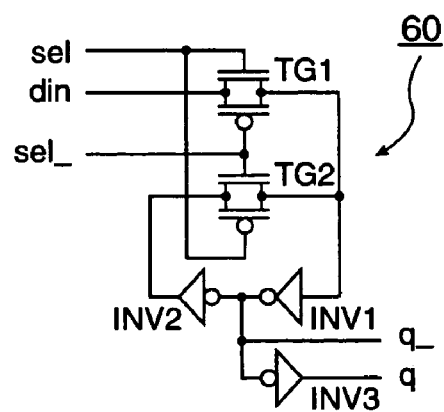
FIG. 18 is a schematic that illustrates composition of the through latch circuit.

FIG. 14 is a diagram showing connection of the differential circuit 20, and FIG. 15 shows its circuit. FIG. 16 depicts differential waves of the CLK signal of the differential circuit 21. As shown, the differential circuit 21 differentiates the CLK signal so as to output R-edge and F-edge signals having a minute pulse width at their rising and falling edges. FIG. 17 is a diagram showing connection of a through latch circuit 60, and FIG. 18 shows its circuit. Referring to FIG. 18, TG1 and TG2 are transfer gates including an N-channel transistor and a P-Channel transistor, respectively. TG1 is conductive when the sel1 signal is high and the sel1_signal is low, and the gate electric potential of an inverter INV 1 is almost the same as the electric potential of the input signal din. The electric potential of the input signal din goes through TG1, INV1, to INV3, and affects the output signal q, while it goes through TG1 to INV1 and affects the output signal q_. Here, when the sel1 signal transits to low and the sel1_signal transits to high, TG1 becomes non-conductive and TG2 becomes conductive, resulting in formation of a feedback loop of INV1, INV2, TG2, and INV1. Then, the electric potential of the output signal q at that time is latched.

Figure 19:
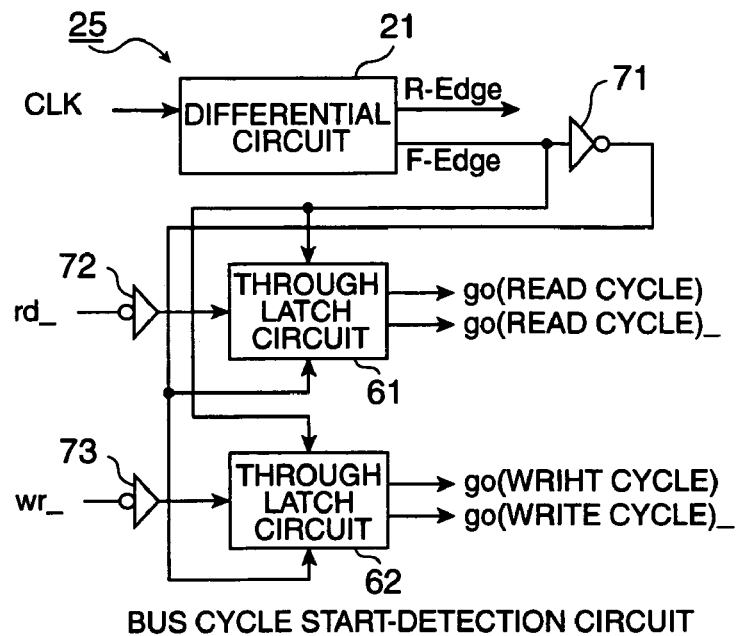
FIG. 19 is a schematic that illustrates composition of a bus cycle start-detection circuit.

FIG. 19 shows a composition of a bus cycle start-detection circuit 25. The bus cycle start-detection circuit 25 mainly includes the differential circuit 21 and through latch circuits 61 and 62. The circuit composition of the through latch circuits 61 and 62 are basically the same as that of the through latch circuit 60 mentioned above. An F-edge signal as a sel1 signal is input into the through latch circuits 61 and 62, while an inverted signal of the F-edge signal as a sel1_signal is input via an inverter 71. Further, an inverted rd_signal or wr_signal as an input signal din is input through an inverter 72 or 73 into the through latch circuit 61 or 62, respectively. Output signals of the through latch circuit 61 are go (READ CYCLE) and go (READ CYCLE)_. Output signals of the through latch 62 are go (WRITE CYCLE) and go (WRITE CYCLE)_.

In order for the finite state machine 22 to transit from the inner cycle to the bus cycle, the rd_signal or the wr_signal needs to be detected as active low at the falling edge of the CLK signal. Because the CLK signal supplied from the synchronous bus 30 to the synchronous/asynchronous interface circuit 20 is not synchronized with the rd_signal and the wr_signal, which are supplied from the asynchronous CPU 10 to the synchronous/asynchronous interface circuit 20, a delicate timing may occur. In other words, the rd_signal or the wr_signal possibly changes to active low at exactly the same time as the CLK signal falls. If the rd_signal or the wr_signal changes at exactly the same time as the F-edge signal transits from high to low, the signal level latched by the through latch circuits 61 and 62 can either be high or low.

Figure 20:
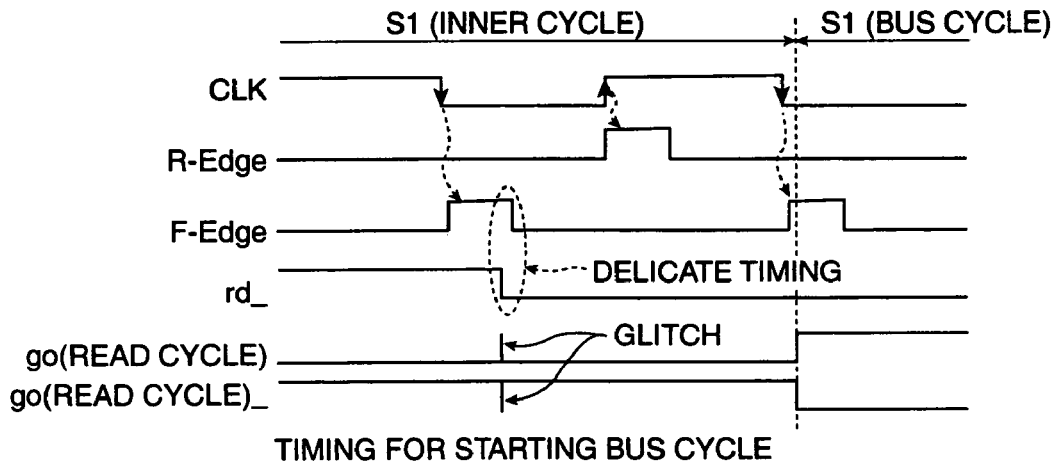
FIG. 20 is a schematic that illustrates timing for starting a bus cycle.
Figure 21:
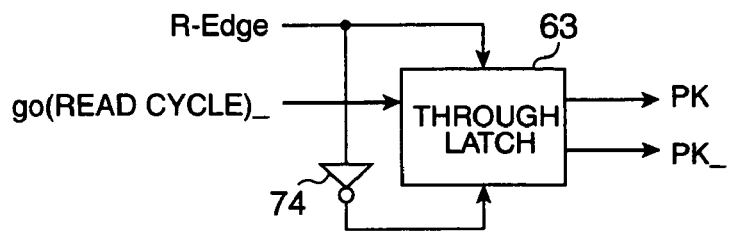
FIG. 21 is a schematic that illustrates composition of a PK output circuit.

FIG. 20 illustrates a timing at which the bus cycle start-detection circuit 25 starts the bus cycle by detecting the rd_signal as active low when the CLK signal falls. With this timing as shown in the drawing, the bus cycle fails to start at the initial fall of the CLK signal and succeeds to start at the next fall. In the drawing, at the delicate timing when the rd_signal transits from high to low at exactly the same time as the F-edge signal transits from high to low, a single glitch may occur on the output go (READ CYCLE) signal and go (READ CYCLE)_signals of the through latch circuit 61, having a peak for driving the latter gate. Since the pulse width of this glitch is so narrow that it disappears by the time when the CLK signal rises, it does not create any problem in the state transition control of the synchronous/asynchronous interface circuit 20. Moreover, so as not to generate racing, the through latch circuits 61 and 62 are designed and verified to be race-free.

As described, if at the falling of the CLK signal an F-edge signal latches the inverted rd_signal to be high, high is output to the go (READ CYCLE) signal, and S1 (inner cycle) transits to S1 (bus cycle). Since an address to be accessed is output to the address bus (a15-00) from the asynchronous CPU 10 at this time, this is output to the address signal of the synchronous bus at this timing. While FIG. 20 shows the timing to start the bus cycle of the read cycle, the same is true with the timing to start the bus cycle of the write cycle. It means that if at the falling of the CLK signal the F-edge signal latches the inverted wr_signal to be high, high is output to the go (WRITE CYCLE) signal and S1 (inner cycle) transits to S1 (bus cycle), while S1 is held if low.

Figure 22:
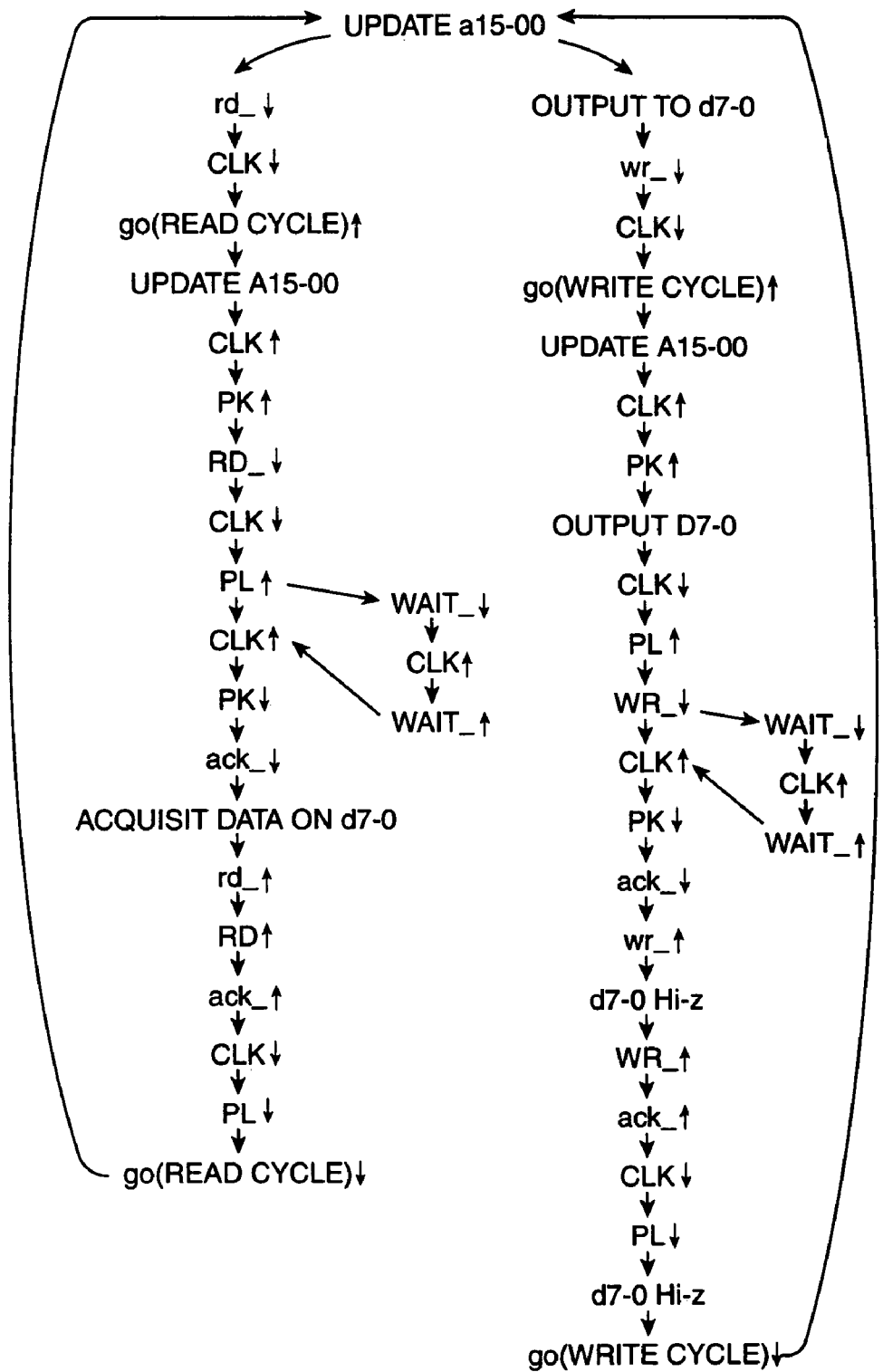
FIG. 22 is a signal transition graph of the bus cycle.

Then, if at the rising of the CLK signal an R-edge signal latches the go (READ CYCLE) signal to be high, high is output to the PK signal and S1 transits to S2, while S1 is maintained if low. Further, if at the falling of the CLK signal the F-edge signal latches the PK signal to be high, high is output to the PL signal and S2 transits to S3, while S2 is maintained if low. Furthermore, if at the rising of the CLK signal the R-edge signal latches the logical multiply (AND) of the PL signal and a WAIT_signal to be high, low is output to the PK signal and S3 transits to S4, while S3 is maintained if low. As thus described, timing of the state transition from S3 to S4 depends on the WAIT_signal. As long as the WAIT_signal is low, the PK signal does not turn to low, and therefore S3 is maintained. Then, if at the falling of the CLK signal the F-edge signal latches the PL signal to be high, low is output to the PL signal, and S4 transits to S1. The generation of the signals involved in the state transition of the read cycle has been described. FIG. 22 is a signal transition graph (STG) of the asynchronous CPU 10 and the synchronous/asynchronous interface. circuit 20 that also shows the state transition of the write cycle.

As herein described, the synchronous/asynchronous interface circuit 20 according to the present exemplary embodiment makes it possible to embed the asynchronous CPU 10 into an entire circuit system as a part of the system, without decreasing the throughput of the entire synchronous circuit system. It is therefore not necessary to redesign the asynchronous CPU 10 in order to satisfy the minimum requirement. Further, when the asynchronous CPU 10 is already designed and required to be reused as an IP in a certain area, the connection design and the verification can be carried out in an extremely short period of time by adopting the synchronous/asynchronous interface circuit 20 according to the present embodiment. The level of verification largely depends on the fact that the synchronous/asynchronous interface circuit 20 includes a finite state machine and handshaking, and is attributed to the fact that the input/output signals of all the circuit blocks involved in the handshaking are acknowledged without fail.

The synchronous/asynchronous interface circuit of the exemplary embodiment of the present invention is applicable for various electronic devices, such as mobile phones, camcorders, mobile personal computers (personal digital assistants), head mount displays, and projectors as part of their circuit components, for example, and can be also used. for various applications, such as system-on-chip or system-on-panel products.

What is claimed is:

1. A synchronous/asynchronous interface circuit that interfaces an asynchronous circuit with a synchronous circuit, comprising:
   a finite state machine having more than two states that controls access cycles between the synchronous circuit and the asynchronous circuit in an event-driven fashion; and
   a detection circuit that detects beginnings of the access cycles,
   the finite state machine transiting the more than two states to control the access cycles while both handshaking with the asynchronous circuit and synchronizing with a global clock supplied from the synchronous circuit.

2. The synchronous/asynchronous interface circuit according to claim 1, the detection circuit including:
   a differential circuit that outputs differential signals, each of the differential signals corresponding to one of a rising edge and a falling edge of the global clock; and
   a through-latch circuit that latches control signals to start the access cycles, only when the differential circuit outputs the differential signals.

3. The synchronous/asynchronous interface circuit according to claim 2, further comprising:
   an address latch circuit that latches address signals output from the asynchronous circuit to send to the synchronous circuit; and
   a data latch circuit that latches data signals output from the asynchronous circuit to send to the synchronous circuit,
   timing for the synchronous/asynchronous interface circuit to output both the address signals and data signals into the synchronous circuit being controlled respectively by the finite state machine in synchronization with the global clock.

4. The synchronous/asynchronous interface circuit according to claim 2, the through-latch circuit being configured to be racing-free.

5. A synchronous/asynchronous interface circuit that interfaces an asynchronous circuit with a synchronous circuit, the synchronous/asynchronous interface circuit comprising:
   a finite state machine having more than two states that controls access cycles between the asynchronous circuit and the synchronous circuit in an event-driven fashion; and
   a detection circuit that detects beginnings of the access cycles,
   the finite state machine transiting the more than two states to:
   control the access cycles by handshaking with the asynchronous circuit, and
   control the access cycles by synchronizing with a global clock supplied from the synchronous circuit.

6. A synchronous/asynchronous interface circuit that interfaces an asynchronous circuit with a synchronous circuit, the synchronous/asynchronous interface circuit comprising:
- a finite state machine having more than two states that controls access cycles between the asynchronous circuit and the synchronous circuit in an event-driven fashion; and
- a detection circuit that detects beginnings of the access cycles,
- the finite state machine transiting the more than two states to:
  - control the access cycles by handshaking with the asynchronous circuit during a period in which a first interface between the finite state machine and the asynchronous circuit is carried out, and
  - control the access cycles by synchronizing with a global clock supplied from the synchronous circuit during a period in which a second interface between the finite state machine and the synchronous circuit is carried out.

* * * * *